United States Patent

Sunehag

(10) Patent No.: US 10,699,187 B2
(45) Date of Patent: Jun. 30, 2020

(54) SELECTING ACTION SLATES USING REINFORCEMENT LEARNING

(71) Applicant: DeepMind Technologies Limited, London (GB)

(72) Inventor: Peter Goran Sunehag, London (GB)

(73) Assignee: DeepMind Technologies Limited

( * ) Notice: Subject to any disclaimer, the term of this patent is extended or adjusted under 35 U.S.C. 154(b) by 648 days.

(21) Appl. No.: 15/367,094

(22) Filed: Dec. 1, 2016

(65) Prior Publication Data

US 2017/0154261 A1 Jun. 1, 2017

Related U.S. Application Data

(60) Provisional application No. 62/261,781, filed on Dec. 1, 2015.

(51) Int. Cl.
*G06F 16/903* (2019.01)
*G06N 3/08* (2006.01)
*G06F 16/9032* (2019.01)

(52) U.S. Cl.
CPC .............. *G06N 3/08* (2013.01); *G06N 3/088* (2013.01); *G06F 16/90324* (2019.01)

(58) Field of Classification Search
CPC . G06N 3/08; G06N 3/088; G06N 3/00; G06F 16/90324
See application file for complete search history.

(56) References Cited

U.S. PATENT DOCUMENTS

2007/0174105 A1 7/2007 Abe et al.

OTHER PUBLICATIONS

Silver et al ("Concurrent Reinforcement Learning from Customer Interactions", Proceedings of the 30th International Conference on Machine Learning, 2013, pp. 1-9) (Year: 2013).*
He et al ("Deep Reinforcement Learning with an Unbounded Action Space", https://arxiv.org/abs/1511.04636, arXiv:1511.0463v2 [cs. AI], Nov. 19, 2015, pp. 1-15) (Year: 2015).*
Fard et al ("Non-Deterministic Policies in Markovian Decision Processes", Journal of Artificial Intelligence Research 40 (2011), pp. 1-14) (Year: 2011).*

(Continued)

*Primary Examiner* — Kakali Chaki
*Assistant Examiner* — Robert Lewis Kulp
(74) *Attorney, Agent, or Firm* — Fish & Richardson P.C.

(57) ABSTRACT

Methods, systems, and apparatus, including computer programs encoded on computer storage media, for selecting action slates using reinforcement learning. One of the methods includes receiving an observation characterizing a current state of an environment; selecting an action slate by processing the observation and a plurality of candidate action slates using a deep neural network, wherein each candidate action slate comprises a respective plurality of actions from the set of actions, and wherein the deep neural network is configured to, for each of the candidate action slates, process the observation and the actions in the candidate action slate to generate a slate Q value for the candidate action slate that is an estimate of a long-term reward resulting from the candidate action slate being provided to the action selector in response to the observation; and providing the selected action slate to an action selector in response to the observation.

20 Claims, 3 Drawing Sheets

(56) References Cited

OTHER PUBLICATIONS

Kale et al ("Non-Stochastic Bandit Slate Problems", Advances in Neural Processing Systems 23 (NIPS 2010), 2010, pp. 1-9) (Year: 2010).*
Kanade et al ("Sleeping Experts and Bandits with Stochastic Action Availability and Adversarial Rewards", Proceedings of the 12th International Conference on Artificial Intelligence and Statistics (AISTATS) 2009, pp. 272-279) (Year: 2009).*
O. Maillard ("Apprentissage Sequentiel: Bandits, Statistique, et Renforcement", Machine Learning, Universite des Sciences et Technologie de Lille—Lille I, 2011, pp. 1-319) (Year: 2011).*
K. Efthymiadis ("Knowledge-Based Reward Shaping with Knowledge Revision in Reinforcement Learning", University of York, Computer Science, PHD Dissertation, Sep. 2014, pp. 1-119) (Year: 2014).*
Prashanth L. A. ("Cumulative Prospect Theory Meets Reinforcement Learning: Prediction and Control", https://arxiv.org/pdf/1506.02632v2.pdf, arXiv:1506.02632v2 [cs.LG] Sep. 20, 2015, pp. 1-27) (Year: 2015).*
Carbonell et al. "The use of MMR, diversity-based reranking for reordering documents and producing summaries," Proceedings of the 21$^{st}$ annual international ACM SIGIR conference on Research and development in information retrieval, Aug. 1, 1998, 3 pages.
Dulac-Arnold et al. "Fast reinforcement learning in large discrete action spaces," arXiv preprint arXiv 1512.07679v2, Apr. 4, 2016, 11 pages.
Fard et al. "Non-deterministic policies in markovian decision processes," Journal of Artificial Intelligence Research, Jan. 1, 2011, 24 pages.
Jarvelin et al. "Cumulated gain-based evaluation of it techniques," ACM Transaction on Information Systems, 20.4, Oct. 1, 2002, 30 pages.
Kale. "Non-Stochastic Bandit Slate Problems," Advances in Neural Information Processing Systems, 2010, 9 pages.
Kahneman et al. "Prospect theory: An analysis of decisions under rise," Econometrica, vol. 47.2, Mar. 1979, 33 pages.
Kveton et al. "Matroid bandits: Fast combinatorial optimization with learning," arXiv preprint arXiv 1403.5045v3, Mar. 20, 2014, 12 pages.
Lillicrap et al. "Continuous control with deep reinforcement learning," arXiv preprint arXiv1509.02971v5, Feb. 29, 2016, 14 pages.
Mnih et al. "Human-level control through deep reinforcement learning," Nature 518.7540, Feb. 2015, 13 pages.
Ng et al. "Autonomous inverted helicopter flight via reinforcement learning," Experimental Robotics IX. Springer Berlin Heidelberg, 2006, 10 pages.
Park et al. "A literature review and classification of recommender system research," Expert Systems with Applications, 39(11), Sep. 1, 2012, 14 pages.
Russel et al. "Artificial Intelligence: A Modern Approach," Artificial Intelligence. Prentice Hall, Egnlewood Cliffs, 25:27, 1995, 75 pages.
Silver et al. "Deterministic policy gradient algorithms," ICML, Jun. 21, 2014, 9 pages.
Van Hassell et al. "Using continuous action spaces to solve discrete problems," Neural Networks, Jun. 14, 2009, 8 pages.
Yue et al. "Linear submodular bandits and their application to diversified retrieval," Advances in Neural Information Processing Systems, 2011, 9 pages.
International Search Report and Written Opinion in International Application No. PCT/US2016/064476, dated Mar. 7, 2017, 14 pages.
Kimura et al. "Reinforcement learning in multi-dimensional state-action space using random rectangular course coding and Gibbs sampling," IEEE/RSJ International Conference on Intelligent Robots and Systems, Oct. 29, 2007, 8 pages.
Onda et al. "A reinforcement learning model using macro-actions in multi-task grid-world problems," IEEE International Conference on Systems, Man and Cybernetics, Oct. 11, 2009, 6 pages.
Ong et al. "Distributed Deep Q-Learning," CME 323: Distributed Algorithms and Optimization, Spring 2015, Stanford University, Aug. 17, 2015, 8 pages.
Sunehag et al. "Deep Reinforcement Learning with Attention for Slate Markov Decision Processes with High-Dimensional State and Actions," arXiv preprint arXiv 1512.01124, Dec. 3, 2015, 15 pages.
EP Communication Pursuant to Article 94(3) EPC in European Appln. No. 16816522.3, dated Jan. 8, 2020, 9 pages.

* cited by examiner

SELECTING ACTION SLATES USING REINFORCEMENT LEARNING

CROSS-REFERENCE TO RELATED APPLICATION

This application claims priority to U.S. Provisional Application No. 62/261,781, filed on Dec. 1, 2015. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to reinforcement learning. In particular, this specification describes techniques for selecting an action slate that includes multiple actions in response to an observation characterizing a state of an environment. An action selector then interacts with the environment by selecting an action, e.g., by selecting an action from the provided action slate.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. A reinforcement learning system can effectively provide slates of actions to an action selector, even when the action that is selected from the slate is not under the control of the reinforcement learning system and even when the action selector can select actions that are not in the provided action slate, i.e. a null action. The reinforcement learning system selects action slates in a manner that optimizes for both the combinatorial and sequential aspects of the action slate selection task, allowing the reinforcement learning system to effectively select action slates even when the space of possible actions is very large. Additionally, the reinforcement learning system can effectively select action slates from high-dimensional observations characterizing the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
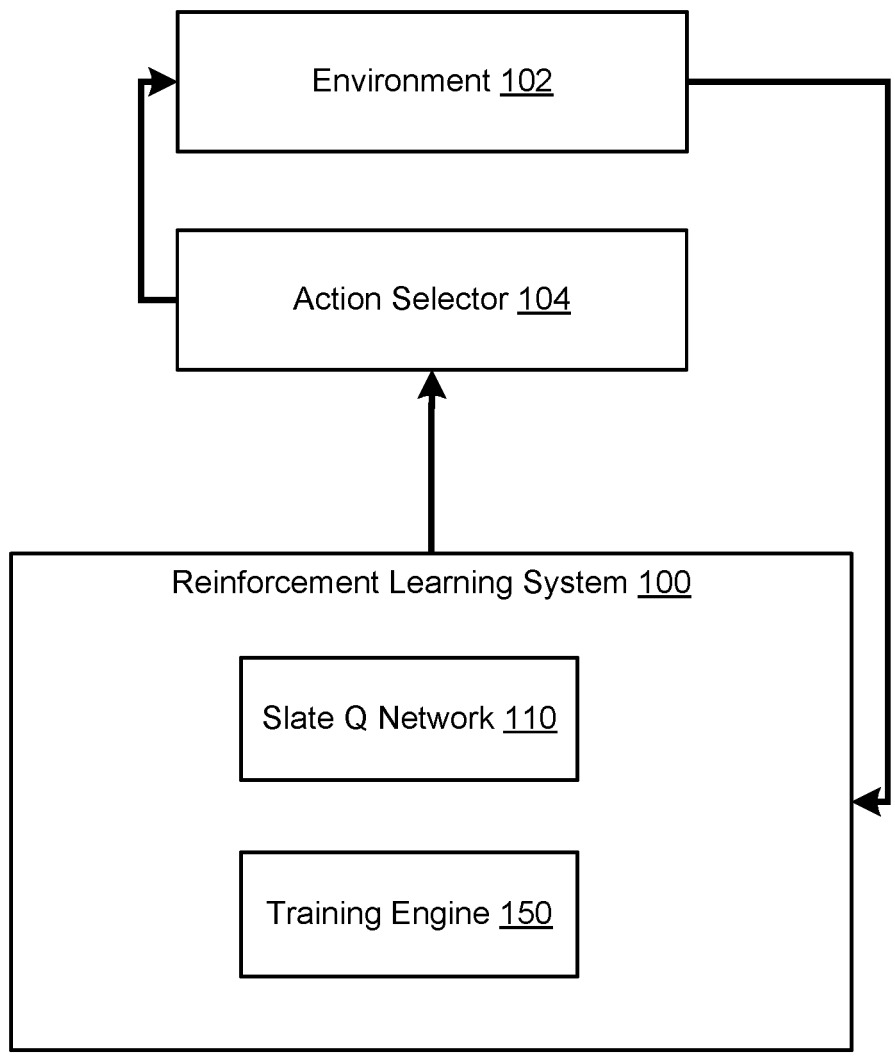
FIG. 1 shows an example reinforcement learning system.

This specification generally describes a reinforcement learning system that selects a slate of actions in response to an observation that characterize the state of an environment and provides the selected action slate to an action selector.

Each slate of actions includes multiple actions from a predetermined set of actions and the action selector interacts with the environment by selecting and performing an action. In some implementations, in response to receiving a given action slate, the action selector selects and performs either (i) an action selected from the action slate or (ii) a null action that is not included in the set of actions.

The environment generally transitions or changes states in response to actions performed by the action selector. In particular, in response to the action selector performing an action, the environment transitions into a new state and the reinforcement learning system receives a reward. The reward is a numeric value that is a function of the state of the environment. While interacting with the environment, the reinforcement learning system attempts to maximize the long-term reward received in response to the actions performed by the action selector.

In some implementations, the environment is a content item presentation setting provided by a content item recommendation system and the action selector is a user of the content item recommendation system. In these implementations, the actions in the set of actions are recommendations of content items, with each action in the action slate being a recommendation of a distinct content item to the user of the content item recommendation system. The user selects and performs an action by selecting a recommendation and viewing the corresponding content item, which can trigger additional recommendations to be provided by the content item recommendation system. In these implementations, the null action corresponds to the user choosing not to select any of the provided content item recommendations.

In some other implementations, the environment is a presentation setting for a software product or content item, the actions are possible configurations for the software product or content item, and the action selector is a computer program that measures the effectiveness of each of the configurations in an action slate that is provided to the action selector and then selects and performs the action, i.e., the configuration, that is most effective. If none of the configurations is more effective than the current configuration for the software product or content item, the action selector selects the null action, i.e., does not select any of the possible configurations to replace the current configuration.

In some other implementations, the environment is a real-world environment that is being navigated through by a vehicle and the action selector is an operator of the vehicle or a control system of the vehicle. In these implementations, the actions in the set of actions are possible control inputs for the vehicle, with each action in the action slate being a distinct possible control input for the vehicle. The operator or the control system selects and performs an action by submitting one of the possible control inputs to cause the vehicle to navigate through the environment. In these implementations, the null action corresponds to the control system or the operator choosing not to select any of the possible control inputs.

In some other implementations, the environment is a networked real-world system, e.g., an electric grid or a data center, the actions are possible settings for the networked real-world system that affect the energy efficiency or performance of the networked system, and the action selector is a control system that selects actions based on different criteria, e.g., safety, or a user that manages the settings for the networked system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 receives observations characterizing states of an environment 102 and, in response to each observation, selects an action slate to be provided to an action selector 104 that selects and performs actions to interact with the environment 102. Each action slate includes multiple actions selected from a predetermined set of possible actions.

In particular, the reinforcement learning system 100 receives an observation characterizing a current state of the environment 102, selects an action slate that includes multiple actions, and provides the selected action slate to the action selector 104.

Generally, the observation is data characterizing the current state of the environment.

For example, in cases where the environment 102 is a content item presentation setting, the observation may be a high-dimensional feature vector that characterizes the current content item presentation setting.

As another example, in cases where the environment 102 is a real-world environment, the observation may include an image of the real-world environment and/or other data captured by other sensors of the vehicle navigating through the real-world environment.

In some implementations, the observation also includes data characterizing a preceding action that was selected by the action selector 104 in response to being provided a preceding slate of actions, i.e., the slate of actions provided to the action selector 104 in response to a preceding observation. For example, the data characterizing the preceding action can be an identifier of the preceding action or a feature vector characterizing properties of the preceding action.

The reinforcement learning system 100 selects the action slate by processing the observation and multiple candidate action slates using a slate Q network 110. The slate Q network 110 is a deep neural network that is configured to, for each of the candidate action slates, process the observation and the actions in the candidate action slate to generate a slate Q value for the candidate action slate that is an estimate of a long-term reward resulting from the candidate action slate being provided to the action selector 104 in response to the observation. The long-term reward can be, for example, the time-discounted sum of future rewards received by the reinforcement learning system 100 after the observation characterizing the current state of the environment 102 is received. Depending on the implementation, the slate Q network 110 can be either a recurrent neural network or a feedforward neural network.

Selecting an action slate using the slate Q network 110 in response to an observation is described in more detail below with reference to FIGS. 2 and 3.

In order to allow the reinforcement learning system 100 to effectively select action slates to be provided to the action selector 104, the reinforcement learning system 100 includes a training engine 150 that trains the slate Q network 110 to adjust the values of the parameters of the slate Q network from initial values of the parameters.

In particular, during the training, the training engine 150 receives, in response to providing an action slate to the action selector 104, a reward and uses the reward in updating values of the parameters of the slate Q network 110. For example, the training engine 150 can receive the reward and a new observation characterizing the state that the environment 102 transitioned into as a result of the action selector 104 selecting and performing an action, e.g., an action from the provided action slate or a null action, and uses the current observation, the action slate provided to the action selector 104 in response to the current observation, the reward, and the next observation to adjust the values of the parameters of the slate Q network 110 using a conventional reinforcement learning technique, e.g., a variant of a deep Q learning or SARSA technique.

In some implementations, the training engine 150 modifies the rewards that are being used to train the slate Q network 110. In particular, in some implementations, during the training, the training engine 150 modifies each received reward to generate a modified reward and uses the modified reward in place of the received reward in adjusting the values of the parameters of the slate Q network 110. In some of these implementations, the training engine 150 replaces a received reward r with a modified reward $\hat{r}a$, where a is a predetermined constant value that is greater than one. For example, a can be a value between 1.25 and 2.5.

Figure 2:
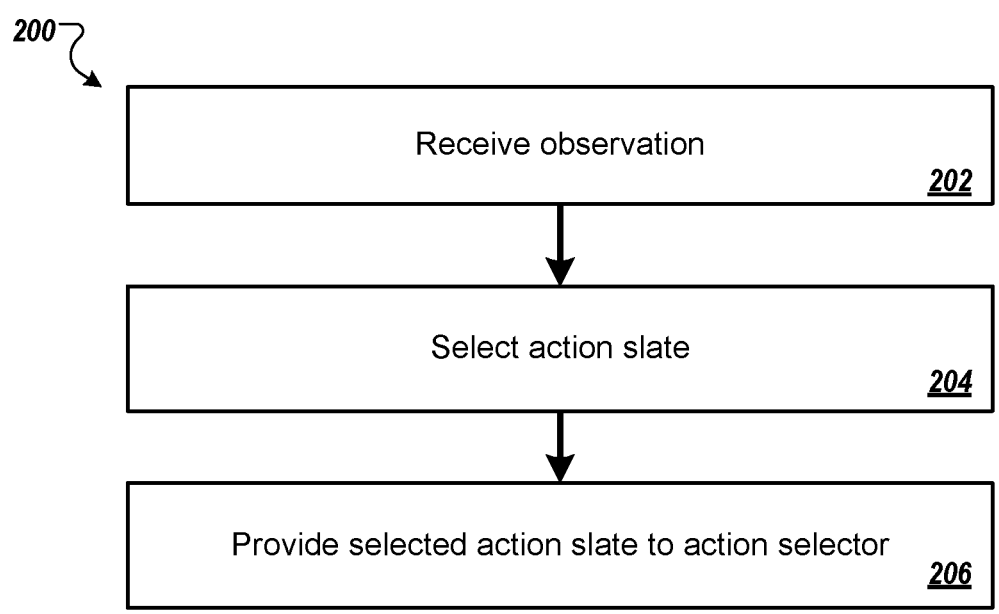
FIG. 2 is a flow diagram of an example process for selecting an action slate in response to the observation.

FIG. 2 is a flow diagram of an example process 200 for selecting an action slate in response to a received observation. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system receives an observation characterizing the current state of the environment (step 202).

The system selects an action slate that includes multiple actions by processing the observation and multiple candidate action slates using a slate Q network (step 204). Generally, each of the candidate action slates includes a different combination of multiple actions from the set of actions.

As described above, the slate Q network is a deep neural network that is configured to, for each of the candidate action slates, process the observation and the actions in the candidate action slate to generate a slate Q value for the candidate action slate that is an estimate of a long-term reward resulting from the candidate action slate being provided to the action selector in response to the observation.

Generally, the final action slate, i.e., the action slate that will be provided to the action selector, has a predetermined number of slots, with each slot being filled with a respective action from the set of actions. Each of the candidate action slates also includes the predetermined number of slots, with the slots being filled with a different combination of actions from each of the other candidate action slates.

To select the final action slate, the system divides the predetermined number of slots into subsets, with each subset being a disjoint partition of the slots in the predetermined number of slots. In some implementations, each subset has one slot. In some other implementations, some or all of the subsets have multiple slots.

The system then orders the subsets and selects the actions that will be in each subset in the final action slate subset by subset, i.e., in a sequence according to the subset ordering. Selecting the actions that will in a given subset of the slots of the final action slate is described in more detail below with reference to FIG. 3.

In some implementations, the slots in the final action slate are ordered from a highest slot in the final action slate to a lowest slot in the final action slate when provided to the action selector. In these implementations, the system orders the subsets according to the slot ordering, i.e., so that subsets that have slots that are higher in the slot ordering are higher in the subset ordering than subsets that have slots that are lower in the slot ordering.

In some other implementations, the system orders the subsets by generating a random ordering for the subsets.

The system provides the selected action slate to the action selector in response to the observation (step 206). Once the action selector has received the action slate, the action selector can select an action to interact with the environment, e.g., by selecting an action from the action slate or selecting a null action that is not included in the set of actions.

Figure 3:
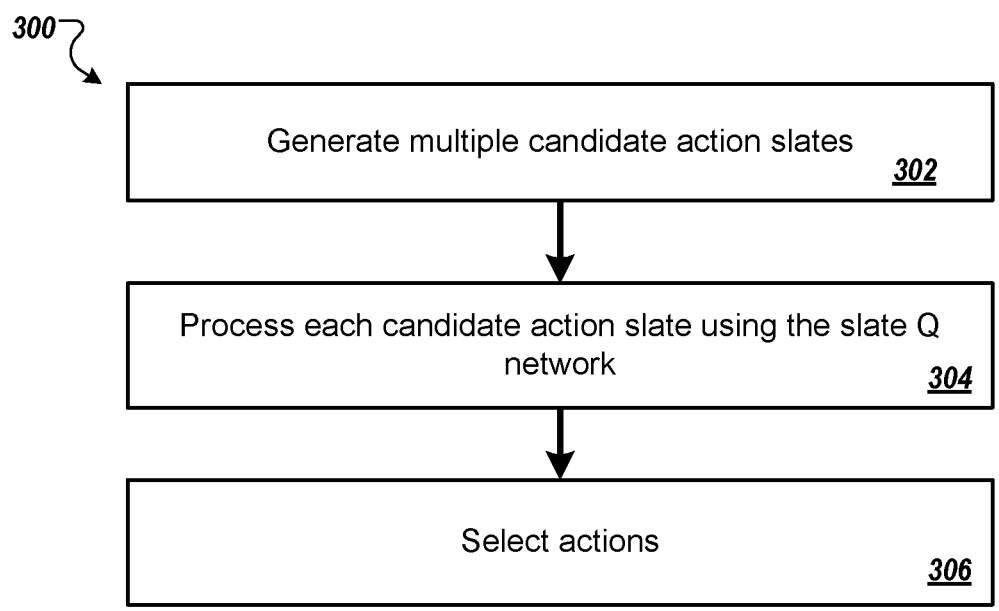
FIG. 3 is a flow diagram of an example process for selecting actions for a given subset of an action slate.

FIG. 3 is a flow diagram of an example process 300 for selecting actions for a given subset of an action slate. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system can perform the process 300 for each subset of the slots in an action slate in sequence according to the subset ordering to select actions for all of the slots of the final action slate that will be provided to the action selector.

The system generates multiple candidate action slates for the given subset of slots (step 302). In particular, each candidate action slate includes (i) in any slot for which an action has already been selected, i.e., in any slot in a subset that is before the given subset in the subset ordering, the action already selected for the slot, (ii) in each of the slots in the given subset, a respective candidate action, and (iii) in any slot other than the slots in the given subset and the slots for which an action has already been selected, a respective placeholder action. When the given subset is the last subset according to the subset ordering, there generally will not be any slots other than the slots in the given subset and the slots for which an action has already been selected, and the candidate action slates for the slot will not include any placeholder actions.

In some implementations, for each candidate action slate, the placeholder actions are selected from the candidate actions at the given subset. That is, when the given subset includes only one slot, the placeholder action at each slot other than the slots in the given subset and the slots for which an action has already been selected is the candidate action at the slot in the given subset. When the given subset includes multiple slots, the placeholder action at each slot other than the slots in the given subset and the slots for which an action has already been selected can be the same candidate action, i.e., selected randomly from the candidate actions at the slots in the given subset, or different candidate actions, i.e., each selected randomly from the candidate actions at the slots in the given subset.

In some other implementations, for each candidate action slate, the placeholder actions are predetermined, i.e., each candidate action slate has the same predetermined actions at any slots other than the slots in the given subset and the slots for which an action has already been selected can be the same candidate action.

In yet other implementations, the system receives actions suggested by an external action recommendation system and uses the received actions as the placeholder actions.

In some implementations, the system selects the candidate actions in each of the candidate action slates from the actions in the set of actions, i.e., selects each candidate action randomly from the actions in the set of actions. In some other implementations, the system receives data identifying a subset of the actions in the set of actions from an external process. If the subset of actions includes the same number of actions as there are slots in the given subset of slots, the system uses the actions in the received subset as the candidate actions. If the subset of actions includes more actions than there are slots in the given subset of slots, the system selects each candidate action, i.e., randomly, from the data identifying the subset of actions.

The system processes each candidate action slate using the slate Q network to generate a respective slate Q value for each of the candidate action slates (step 304). That is, for each of the candidate action slates, the system processes the observation and the actions in the candidate action slate using the slate Q network to generate a slate Q value for the candidate action slate.

The system selects as the actions in the given subset of slots in the action slate the candidate actions that are in the slots in the given subset in the candidate action slate having the highest slate Q value (step 306).

The system can repeat the process 300 for each subset of slots in sequence from the first subset in the subset ordering to the last subset in the subset ordering to generate the final action slate that is provided to the action selector.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of providing a slate of actions to an action selector that interacts with an environment by selecting and performing actions, wherein the slate of actions includes a plurality of actions selected from a predetermined set of actions to fill a predetermined number of slots in an action slate, and wherein the environment transitions states in response to actions performed by the action selector, the method comprising:
   receiving an observation characterizing a current state of the environment;
   dividing the predetermined number of slots into a plurality of subsets, wherein each subset is a disjoint partition of the slots in the predetermined number of slots;
   selecting, in a sequence according to a subset ordering of the plurality of subsets, actions to fill in each subset, comprising, for a given subset of the plurality of subsets:
      generating a plurality of candidate action slates for the given subset of slots, each candidate action slate for the given subset of slots including:
         in any slot that is in any subset before the given subset in the subset ordering, the action already selected for the slot,
         a respective candidate action in each of the slots in the given subset, wherein each candidate action slate has a different combination of candidate actions in the slots in the given subset from each other candidate action slate, and
         a respective placeholder action in any slot in the action slate other than the slots in the given subset and the slots that are in any subset before the given subset in the subset ordering; and
      for each candidate action slate, processing the candidate action slate using a deep neural network, wherein the deep neural network receives, as input, the observation and the candidate action slate, and generates, as output, a slate Q value for the candidate action slate that is an estimate of a long-term reward resulting from the candidate action slate being provided to the action selector in response to the observation;
      selecting a candidate action slate from the plurality of candidate action slates based on the generated slate Q values for the candidate action slates; and
      selecting, as the actions in the slots in the given subset, the actions in the slots in the selected candidate action slate;
   generating a final action slate, wherein the final action slate comprises the selected actions for the slots in each subset; and
   providing the final action slate to the action selector in response to the observation.

2. The method of claim 1, wherein, in response to receiving the final action slate, the action selector performs either (i) an action selected from the final action slate or (ii) a null action that is not included in the set of actions in the final action slate.

3. The method of claim 1, wherein the given subset of slots has a predetermined number of slots that is greater than one.

4. The method of claim 1, wherein the given subset of slots has one slot.

5. The method of claim 1, wherein the slots in the action slate are ordered from a highest slot in the action slate to a lowest slot in the action slate when provided to the action selector.

6. The method of claim 1, further comprising:
   generating a random ordering of subsets of slots in the action slate, wherein selecting, in the sequence according to the subset ordering of the plurality of subsets, actions to fill in each subset comprises selecting actions for each subset of slots in the action slate in a sequence according to the random ordering.

7. The method of claim 1, wherein, for each candidate action slate, the placeholder action is the same as one of the candidate actions in the given subset.

8. The method of claim 1, wherein, for each candidate action slate, the placeholder actions are actions suggested by an another action recommendation system.

9. The method of claim 1, wherein the actions in each candidate action slate are selected from a subset of the actions in the predetermined set of actions generated by an another process.

10. The method of claim 1, further comprising:
    receiving a reward in response to providing the final action slate to the action selector; and
    using the reward in updating values of parameters of the deep neural network.

11. The method of claim 10, wherein using the reward in updating values of the parameters of the deep neural network comprises:
    receiving a next observation characterizing a next state of the environment; and
    using the current observation, the final action slate, the reward, and the next observation to update the values of the parameters of the deep neural network.

12. The method of claim 11, wherein using the current observation, the final action slate, the reward, and the next observation to update the values of the parameters of the deep neural network comprises:
    modifying the reward to generate a modified reward; and
    using the modified reward in place of the reward in updating the values.

13. The method of claim 12, wherein the modified reward satisfies r^a, wherein r is the reward and a is a constant value greater than one.

14. The method of claim 1, wherein the environment is a content item presentation setting provided by a content item recommendation system, wherein the action selector is a user of the content item recommendation system, wherein the actions in the set of actions are recommendations of content items, and wherein each action in the action slate is a recommendation of a distinct action to the user of the content item recommendation system.

15. The method of claim 1, wherein the observation characterizing the current state includes data characterizing a preceding action that was selected by the action selector from a preceding slate of actions provided to the action selector in response to a preceding observation.

16. A system comprising one or more computers and one or more storage devices storing instructions that, when executed by the one or more computers, cause the one or more computers to perform operations for providing a slate of actions to an action selector that interacts with an environment by selecting and performing actions, wherein the slate of actions includes a plurality of actions selected from a predetermined set of actions to fill a predetermined number of slots in an action slate, and wherein the environment transitions states in response to actions performed by the action selector, the operations comprising:

receiving an observation characterizing a current state of the environment;

dividing the predetermined number of slots into a plurality of subsets, wherein each subset is a disjoint partition of the slots in the predetermined number of slots;

selecting, in a sequence according to a subset ordering of the plurality of subsets, actions to fill in each subset, comprising, for a given subset of the plurality of subsets:

generating a plurality of candidate action slates for the given subset of slots, each candidate action slate for the given subset of slots including:

in any slot that is in any subset before the given subset in the subset ordering, the action already selected for the slot, a respective candidate action in each of the slots in the given subset, wherein each candidate action slate has a different combination of candidate actions in the slots in the given subset from each other candidate action slate, and a respective placeholder action in any slot in the action slate other than the slots in the given subset and the slots that are in any subset before the given subset in the subset ordering; and for each candidate action slate, processing the candidate action slate using a deep neural network, wherein the deep neural network receives, as input, the observation and the candidate action slate, and generates, as output, a slate Q value for the candidate action slate that is an estimate of a long-term reward resulting from the candidate action slate being provided to the action selector in response to the observation;

selecting a candidate action slate from the plurality of candidate action slates based on the generated slate Q values for the candidate action slates; and selecting, as the actions in the slots in the given subset, the actions in the slots in the selected candidate action slate;

generating a final action slate, wherein the final action slate comprises the selected actions for the slots in each subset; and providing the final action slate to the action selector in response to the observation.

17. The system of claim 16, wherein, in response to receiving the action slate, the action selector performs either (i) an action selected from the final action slate or (ii) a null action that is not included in the set of actions in the final action slate.

18. The system of claim 16, wherein the given subset of slots has a predetermined number of slots that is greater than one.

19. The system of claim 16, wherein the given subset of slots has one slot.

20. One or more non-transitory computer storage media encoded with instructions that, when executed by one or more computers, cause the one or more computers to perform operations for providing a slate of actions to an action selector that interacts with an environment by selecting and performing actions, wherein the slate of actions includes a plurality of actions selected from a predetermined set of actions to fill a predetermined number of slots in an action slate, and wherein the environment transitions states in response to actions performed by the action selector, the operations comprising:

receiving an observation characterizing a current state of the environment;

dividing the predetermined number of slots into a plurality of subsets, wherein each subset is a disjoint partition of the slots in the predetermined number of slots;

selecting, in a sequence according to a subset ordering of the plurality of subsets, actions to fill in each subset, comprising, for a given subset of the plurality of subsets:

generating a plurality of candidate action slates for the given subset of slots, each candidate action slate for the given subset of slots including:

in any slot that is in any subset before the given subset in the subset ordering, the action already selected for the slot, a respective candidate action in each of the slots in the given subset, wherein each candidate action slate has a different combination of candidate actions in the slots in the given subset from each other candidate action slate, and a respective placeholder action in any slot in the action slate other than the slots in the given subset and the slots that are in any subset before the given subset in the subset ordering; and for each candidate action slate, processing the candidate action slate using a deep neural network, wherein the deep neural network receives, as input, the observation and the candidate action slate, and generates, as output, a slate Q value for the candidate action slate that is an estimate of a long-term reward resulting from the candidate action slate being provided to the action selector in response to the observation;

selecting a candidate action slate from the plurality of candidate action slates based on the generated slate Q values for the candidate action slates; and selecting, as the actions in the slots in the given subset, the actions in the slots in the selected candidate action slate;

generating a final action slate, wherein the final action slate comprises the selected actions for the slots in each subset; and providing the final action slate to the action selector in response to the observation.

\* \* \* \* \*